United States Patent [19]
Orthey

[11] Patent Number: 5,272,810
[45] Date of Patent: Dec. 28, 1993

[54] GARDEN SHEARS HAVING A CUTTING BLADE AND AN ANVIL COOPERATING WITH IT

[75] Inventor: Gebhard Orthey, Nauroth, Fed. Rep. of Germany

[73] Assignee: Wolf-Geräte GmbH Vertriebsgesellschaft KG, Fed. Rep. of Germany

[21] Appl. No.: 919,066

[22] Filed: Jul. 23, 1992

[30] Foreign Application Priority Data

Jul. 23, 1991 [DE] Fed. Rep. of Germany ... 9109071[U]

[51] Int. Cl.⁵ .............................................. B26B 17/00
[52] U.S. Cl. ........................................ 30/186; 30/193
[58] Field of Search ............... 30/186, 173, 193, 175; 411/338, 339, 366

[56] References Cited

U.S. PATENT DOCUMENTS

| | | | |
|---|---|---|---|
| 1,467,824 | 9/1923 | Ahlers | 411/339 |
| 2,295,385 | 9/1942 | Connors | 30/186 |
| 2,528,815 | 11/1950 | Boyer | 30/173 |
| 2,574,354 | 11/1951 | Smith | 30/186 |
| 2,821,018 | 1/1958 | Schwieso | 30/186 |
| 3,352,195 | 11/1967 | Fisher | 411/338 |
| 3,372,478 | 3/1968 | Wallace et al. | 30/193 |
| 3,462,114 | 8/1969 | O'Dell, Sr. et al. | 411/338 |
| 5,003,695 | 4/1991 | Lipscomb et al. | 30/193 |

FOREIGN PATENT DOCUMENTS 1571582 1/1977 United Kingdom .

*Primary Examiner*—Douglas D. Watts
*Assistant Examiner*—Hwei-Siu Payer
*Attorney, Agent, or Firm*—Ostrolenk, Faber, Gerb & Soffen

[57] ABSTRACT

In garden shears of this type, the anvil and/or the cutter are adjustable with respect to the cutting edge of the blade. For this purpose, the anvil has slots which may be linear or curved and are set at an angle with respect to the cutting edge. These slots serve as guidance for anvil bushings which are slidably disposed in the slots. Together with screws which are threaded into the bushings, a clamping connection is produced between the anvil and the shear arm. In the cutting direction there is provided, in every position, a locked support via the anvil bushings in the guide slots.

11 Claims, 1 Drawing Sheet

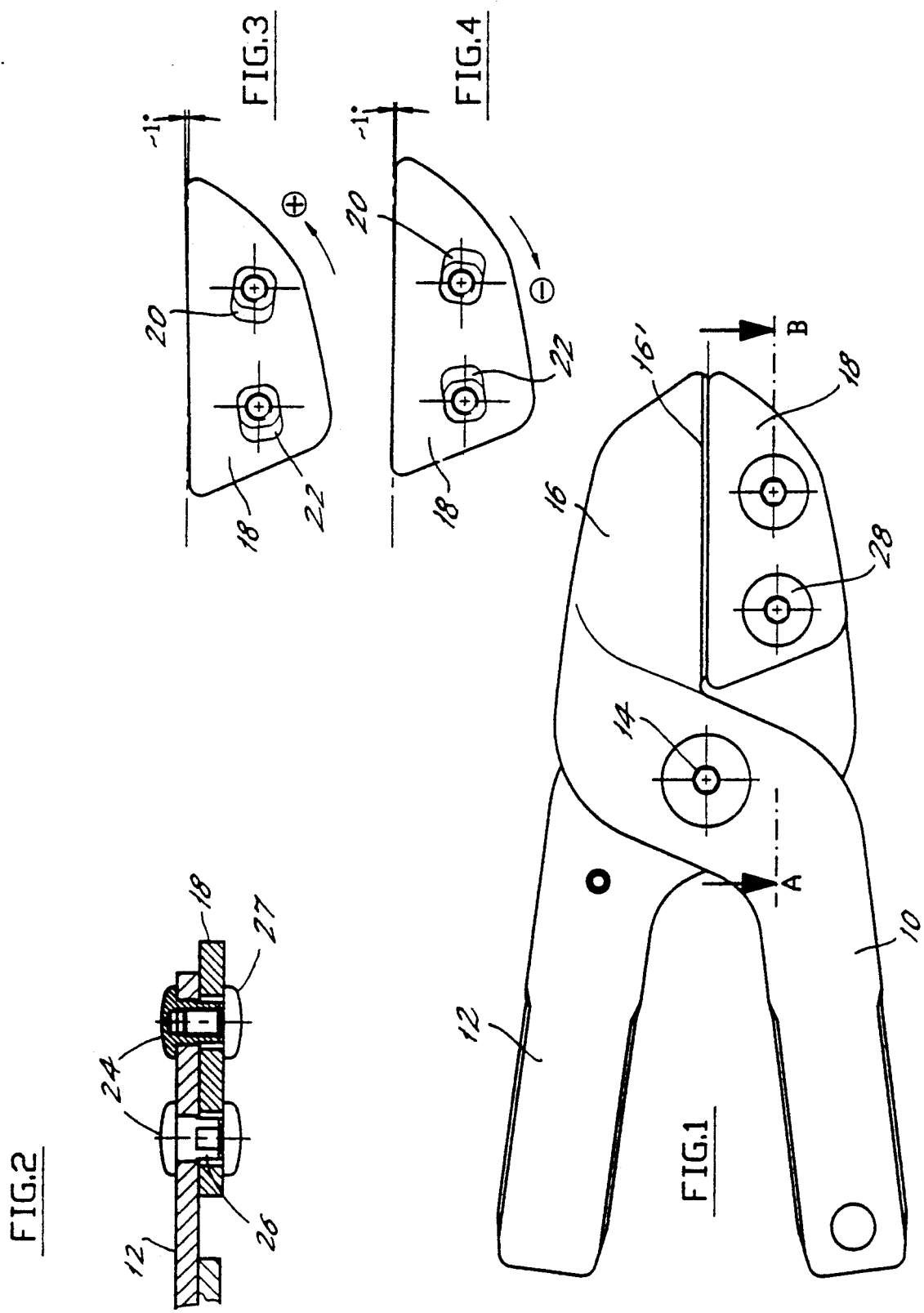

GARDEN SHEARS HAVING A CUTTING BLADE AND AN ANVIL COOPERATING WITH IT

BACKGROUND OF THE INVENTION

The present invention relates to garden shears having a cutting blade on one arm of the shears and an anvil on the other arm of the shears. In these shears, in the closed position the cutter lies in the central region of the anvil. In order to be able to make a dependable continuous cut over the entire length of the cutter, the cutter should, the closed position, contact the anvil along a straight line, i.e. the cutter and anvil should be parallel to each other.

After protracted use, as a result of wear and/or displacement, the cutter and anvil may come together at a slight angle, as a result of which cutting performance is impaired.

With previously known shears this disadvantage had to be eliminated by regrinding the cutting blade or anvil, which could only be done in a specialized workshop.

SUMMARY OF THE INVENTION

An object of the present invention is to assure a clean cutting of the material, by the fact that the linear contact between the cutter and anvil is retained, even after lengthy use, without it being necessary to repair the shears in a specialized workshop.

This object is achieved by adjusting the position of that the anvil and/or the cutter with respect to the cutting edge. The adjustment could be effected by pivoting the anvil and/or cutter around an axis which intersects the cutting plane perpendicularly. In this way, a certain self-centering could be obtained. However, there is the disadvantage that continuous displacement during use could occur. Therefore, in accordance with one embodiment of the invention, the adjustment is effected so that a locked support is assured in all positions. For this purpose, the anvil (or the cutting blade) is preferably provided with two slots which are slightly inclined to each other and into which anvil bushings having square flattened ends protrude, fixed against rotation. After the loosening of the clamping screws, it is then possible to adjust the anvil by an angle of about 1° in either direction by displacement within the slots. As soon as the correct position has been obtained, which can be assured by closing the shears, the screws present on the anvil side are tightened by an allen wrench. Since the bushings extend fixed against rotation into the slots, the adjustment can be effected with a single wrench.

DESCRIPTION OF THE DRAWINGS

One embodiment of the invention will be described below with reference to the drawing, in which:

FIG. 1 is a side view of shears having an adjustable anvil;

FIG. 2 is a cross-sectional view taken along the line A-B of FIG. 1;

FIG. 3 is a side view of the anvil in one angular end position (swung in counterclockwise direction out of the zero position);

FIG. 4 is a side view of the anvil in a second angular end position (swung in the clockwise direction out of the zero position).

DESCRIPTION OF THE PREFERRED EMBODIMENTS

The shears shown in FIG. 1 comprise two shear arms 10 and 12, which are swingably connected to each other by a pin 14. The shear arm 10 bears, firmly attached to it, a cutter 16 having cutting edge 16'. The shear arm 12 adjustably bears an anvil 18. The anvil 18 has two slots 20 and 22, oppositely inclined with each other and arranged at acute angles with respect to the cutting edge. As shown in FIG. 2, the shear arm 12 there are drilled two holes into which anvil bushings 24 are inserted. These bushings have a square head 26, the width of the flat ends of which correspond to the width of the slots 20 and 22. The head 26 lie within the slots and are fixed against rotation. The anvil bushings are secured by screws 27 which can be screwed into bushings 24 and have at their head a hexagon socket 28, so that after the loosening of the screws 27, an adjustment of an angle of about 1°, can be easily effected between the two end angle positions, shown in FIGS. 3 and 4.

In accordance with the embodiment shown, the slots 20, 22 are provided in the anvil but it is also possible to arrange these slots in the shear arm and to insert the anvil bushings into holes in the anvil 18. Instead of the anvil being adjustable, the cutting blade 16 could, with the anvil fixed in position, be adjustable in the same way. It is also possible for both cutter and anvil to be adjustable.

The shears shown in FIG. 1 represent merely one embodiment, and the principle of the displacement can be employed also in all other comparable shears regardless of the lever arrangement with which they are equipped.

I claim:

1. Garden shears, comprising:
   first and second shear arms;
   a cutting blade defining a cutting edge disposed on the first shear arm;
   an anvil adjustably disposed on the second shear arm, the anvil being adjustable with respect to the cutting edge; and
   slide-adjustment means located at the anvil and the second shear arm for adjusting the position of the anvil with respect to the cutting edge, the slide-adjustment means comprising a plurality of slots located in one of the anvil and the second shear arm, the slots being inclined in opposite directions with respect to the cutting edge, a bushing slidably disposed in each of the slots, wherein said second shear arm includes a respective opening aligned with each of said slots, each said bushing extending through the corresponding opening and slot to link the second shear arm and the anvil, said bushings being slidable within the corresponding slots to adjust over an arc the position of the anvil with respect to the second shear arm and with respect to the cutting edge of the cutting blade.

2. Garden shears according to claim 1, wherein each said bushing has a square, flat head having a width smaller than the width of the corresponding slot.

3. Garden shears according to claim 2, wherein each said bushing is secured in the corresponding slot by a respective screw.

4. Garden shears according to claim 3, wherein a head of each said screw has a hexagonal shaped socket.

5. Garden shears according to claim 1, wherein the two slots are inclined in opposite directions with respect to each other.

6. Garden shears according to claim 5, wherein the anvil is disposed below the cutting blade and a first of the slots is inclined upwardly toward the cutting edge of the blade and a second of the slots is inclined downwardly away from the cutting edge.

7. Garden shears according to claim 1, wherein each said bushing is secured in the corresponding slot by a respective screw.

8. Garden shears according to claim 7, wherein a head of each said screw has a hexagonal shaped socket.

9. Garden shears, comprising:
   first and second shear arms;
   a cutting blade defining a cutting edge disposed on the first shear arm;
   an anvil disposed on the second shear arm;
   at least one element selected from the group consisting of the anvil and the cutting blade being adjustable by slide-adjustment means with respect to the corresponding shear arm, said slide-adjustment means guiding said at least one element over an arc for defining a cutting line formed between the anvil and the cutting blade;
   wherein the slide-adjustment means comprises two slots located in one of said element and the corresponding shear arm, the slots being inclined in opposite directions with respect to the cutting line, wherein said corresponding shear arm includes a respective opening aligned with each of the slots, a bushing slidably disposed in each of the slots, each said bushing extending through the corresponding opening and slot to link the element and corresponding shear arm, said bushings being slidable within the corresponding slots to adjust over an arc the position of the element with respect to the corresponding shear arm.

10. Garden shears as in claim 9, wherein said slide-adjustment means is located at the anvil and the second shear arm for adjusting the position of the anvil with respect to the second shear arm and thereby with respect to the cutting edge.

11. Garden shears as in claim 10, wherein said slots are formed in said anvil.

* * * * *